United States Patent
Drew et al.

(10) Patent No.: US 12,332,099 B2
(45) Date of Patent: Jun. 17, 2025

(54) VIRTUAL FLOW METERING USING ACOUSTICS FOR A WELL

(71) Applicant: Halliburton Energy Services, Inc., Houston, TX (US)

(72) Inventors: Julian Edmund Drew, Aurora, CO (US); Benjamin Simon Schaeffer, Denver, CO (US); Mikko Jaaskelainen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 231 days.

(21) Appl. No.: 17/961,291

(22) Filed: Oct. 6, 2022

(65) Prior Publication Data

US 2024/0118118 A1 Apr. 11, 2024

(51) Int. Cl.
*E21B 7/00* (2006.01)
*G01F 1/66* (2022.01)

(52) U.S. Cl.
CPC ..................... *G01F 1/666* (2013.01)

(58) Field of Classification Search
None
See application file for complete search history.

(56) References Cited

U.S. PATENT DOCUMENTS

| | | |
|---|---|---|
| 6,216,544 B1 | 4/2001 | Adachi et al. |
| 8,204,693 B2 | 6/2012 | Briers et al. |
| 2015/0377667 A1* | 12/2015 | Ahmad ............... G01F 1/74 702/48 |
| 2017/0275986 A1* | 9/2017 | Nunes ............... G01H 17/00 |
| 2018/0003032 A1 | 1/2018 | Donzier et al. |
| 2018/0073904 A1 | 3/2018 | Parolini et al. |
| 2018/0202264 A1 | 7/2018 | Sarduy et al. |
| 2018/0356275 A1 | 12/2018 | Zhao et al. |
| 2019/0219716 A1 | 7/2019 | O'Toole et al. |
| 2019/0242735 A1 | 8/2019 | Garoon et al. |

(Continued)

FOREIGN PATENT DOCUMENTS

| | | |
|---|---|---|
| CN | 113341459 | 9/2021 |
| CN | 114371504 | 4/2022 |

(Continued)

OTHER PUBLICATIONS

"PCT Application No. PCT/US2022/077293, International Search Report and Written Opinion", Jun. 27, 2023, 17 pages.

(Continued)

*Primary Examiner* — John E Breene
*Assistant Examiner* — Nigel H Plumb
(74) *Attorney, Agent, or Firm* — DeLizio, Peacock, Lewin & Guerra LLP

(57) ABSTRACT

A method for determining flow information of a well producing fluid from a subsurface formation comprising. The method comprises obtaining at least one first production measurement from the well. The method comprises obtaining, with a sensor, a first measurement generated by the fluid flowing through a device. The method comprises inputting the first measurement and the at least one first production measurement into a virtual flow meter. The method comprises determining, via the virtual flow meter, a multi-phase flow rate of the fluid based on the first measurement and the at least one first production measurement.

20 Claims, 10 Drawing Sheets

(56) References Cited

U.S. PATENT DOCUMENTS

| | | | |
|---|---|---|---|
| 2019/0324166 | A1 | 10/2019 | Lolla et al. |
| 2019/0338621 | A1 | 11/2019 | Jin et al. |
| 2020/0025963 | A1 | 1/2020 | Ghahfarokhi et al. |
| 2020/0278465 | A1 | 9/2020 | Salman et al. |
| 2020/0309981 | A1 | 10/2020 | Ang et al. |
| 2021/0010839 | A1 | 1/2021 | Garoon et al. |
| 2021/0018655 | A1 | 1/2021 | Sun et al. |
| 2021/0025740 | A1* | 1/2021 | Quin .................... G01F 15/005 |
| 2021/0047916 | A1 | 2/2021 | Thiruvenkatanathan et al. |
| 2021/0088476 | A1 | 3/2021 | Abdelfattah et al. |
| 2021/0089905 | A1 | 3/2021 | Olsen et al. |
| 2021/0123334 | A1 | 4/2021 | Madasu et al. |
| 2021/0318457 | A1 | 10/2021 | Zheng et al. |
| 2021/0381865 | A1 | 12/2021 | Ellison |
| 2021/0382194 | A1 | 12/2021 | Mukhtarov et al. |
| 2021/0389486 | A1 | 12/2021 | Thiruvenkatanathan |
| 2022/0034220 | A1 | 2/2022 | Madasu et al. |
| 2022/0065085 | A1 | 3/2022 | Shetty et al. |
| 2023/0417136 | A1 | 12/2023 | Gibson, Jr. |
| 2024/0027640 | A1 | 1/2024 | Schaeffer |
| 2024/0102835 | A1 | 3/2024 | Jaaskelainen et al. |

FOREIGN PATENT DOCUMENTS

| | | |
|---|---|---|
| EP | 1250513 | 4/2005 |
| EP | 3800323 | 4/2021 |
| GB | 2570260 | 4/2022 |
| WO | 2021133864 | 7/2021 |
| WO | 2023249663 | 12/2023 |
| WO | 2024019761 | 1/2024 |
| WO | 2024072454 | 4/2024 |

OTHER PUBLICATIONS

"PCT Application No. PCT/US2022/077805, International Search Report and Written Opinion", Jul. 3, 2023, 9 pages.

Becker, et al., "Distributed Acoustic Sensing as a Distributed Hydraulic Sensor in Fractured Bedrock", Water Sources Ressearch, vol. 56, Issue 9, Aug. 14, 2020, 10 pages.

Carpenter, "Distributed Fiber-Optic Sensing Enhances Flow Diagnostics in Gas Condensate Well", Journal of Petroleum Technology, vol. 74, Issue 3, Mar. 1, 2022, 3 pages.

Dande, et al., "Fluid Flow Rate and Perforation Cluster Efficiency Using Fiber-Optics DAS Data", 55th U.S. Rock Mechanics/Geomechanics Symposium Jun. 18-25, 2021, Jun. 18, 2021, 6 pages.

Drew, et al., "Oil and Gas Well Multi-Phase Fluid Flow Monitoring With Multiple Transducers and Machine Learning", Pending U.S. Appl. No. 63/263,898, filed Nov. 11, 2021, 17 pages.

Ekechukwu, et al., "Well-Scale Demonstration of Distributed Pressure Sensing Using Fiber-Optic DAS and DTS", Scientific Reports vol. 11, Article No. 12505 (2021), Jun. 14, 2021, 18 pages.

Garcia-Ceballos, "Machine Learning Based Two-Phase Flow Monitoring Using DAS", Colorado School of Mines; 2021 Virtual Undergraduate Research Symposium; https://www.mines.edu/undergraduate-research/machine-learning-based-two-phase-flow-monitoring-using-das/, Apr. 19-23, 2021, 6 pages.

Sharma, et al., "Well-Scale Multiphase Flow Characterization and Validation Using Distributed Fiber-Optic Sensors for Gas Kick Monitoring", Optics Express vol. 28, Issue 26, Dec. 21, 2020, 15 pages.

"PCT Application No. PCT/US2022/073172, International Search Report and Written Opinion", Mar. 23, 2023, 9 pages.

"PCT Application No. PCT/US2022/074086, International Search Report and Written Opinion", Apr. 13, 2023, 10 pages.

Anikiev, et al., "Microseismic event location using artificial neural networks", First International Meeting for Applied Geoscience & Energy Expanded Abstracts, Sep. 1, 2021, 5 pages.

Castellanos, et al., "Microseismic Event Locations using the Double-Difference Algorithm", Recorder: Official Publication of the Canadian Society of Exploration Geophysicists, vol. 38 Issue No. 03, Mar. 1, 2013, 12 pages.

"Distributed acoustic sensing", Wikipedia, The Free Encyclopedia. Wikipedia, The Free Encyclopedia, Jul. 5, 2022.) (Year: 2022), Jul. 5, 2022, 4 pages.

"U.S. Appl. No. 17/871,545 Non-Final Office Action", filed Oct. 15, 2024, 26 pages.

Huot, et al., "Detection and Characterization of Microseismic Events from Fiber-Optic DAS Data Using Deep Learning", Sensors (Basel). Oct. 5, 2021;21(19):6627. doi: 10.3390/s21196627. PMID: 34640947; PMCID: PMC8512364.) (Year: 2021), Mar. 14, 2022, 27 pages.

Wamriew, et al., "Deep Neural Networks for Detection and Location of Microseismic Events and Velocity Model Inversion from Microseismic Data Acquired by Distributed Acoustic Sensing Array", Sensors (Basel). Oct. 5, 2021;21(19):6627. doi: 10.3390/s21196627. PMID: 34640947; PMCID: PMC8512364.) (Year: 2021), Oct. 5, 2021, 17 pages.

"U.S. Appl. No. 17/849,301 Non-Final Office Action", filed Jan. 15, 2025, 28 pages.

* cited by examiner

VIRTUAL FLOW METERING USING ACOUSTICS FOR A WELL

FIELD

The disclosure relates generally to the field of wellbore operations and more particularly to the field of wellbore fluid flow rate prediction.

BACKGROUND

In hydrocarbon recovery operations from a wellbore, monitoring flow rates of the types of fluids produced within the wellbore can be important in order to maximize hydrocarbon recovery. One method to measure the flow rate of the different fluids is to separate the different phases (i.e., fluids) and independently measure each phase flow rate. Fluid separators are extensively used in oil and gas production, with the water, oil, and gas phases processed separately.

In the case of a multi-well completion, it is generally more cost effective to aggregate the flow from multiple wells into a single separator, rather than each well having its own separator. The disadvantage of aggregating the flow from the separate wells is that there is then no simple way of determining flow rates of the different fluid phases of each well.

An option for monitoring and determining multiphase flow from individual wells includes the operating of a test-separator, where wells may be individually flowed into the test-separator, thus providing a snapshot of the fluid flow rates. This, however, may not provide a continuous record of production and may not monitor production from the individual wells at the same time. Multi-phase flow meters may be installed on individual wells to monitor each well separately. However, multi-phase flow meters are costly to install and operate. They may require continued maintenance and calibration if they are to record accurate flow rates.

Flow meters and multi-phase flow meters are instruments designed to work by a variety of means, directly measuring parameters that then determine the flow rate of the fluid or fluids through the flow meter. For example, this includes measuring and determining fluid velocity, pressure changes, capacitance, conductance, doppler effects, density measurements, etc. In the case of multi-phase fluid, imaging or tomographic methods may be employed to generate an image of the cross section of the flow to determine the constituent phases of the flow. The different phases may include different fluids such as oil, water, and gas and may also include solids, such as sand.

To overcome the above noted and other problems, there is a need for virtual flow metering. Virtual flow metering is a method of estimating flow rates, including multi-phase flow, by analyzing signals and measurements from the plurality of sensors within a system and incorporating other information, such as produced fluid properties. In addition to flow meter measurements this data may also include pressure measurements, temperature measurements, position and settings of flow control valves, information from production systems (e.g., electrical submersible pumps, gas lift) and in general, any measurement or data that may already recoded that may help to determine the multi-phase flow from individual wells.

The analysis of the data in virtual flow metering may be by software that may include a model based on the system of wells, pipes, valves, separators, flow meters, sensors. Another approach may include training a machine learning model based entirely on collected data, including collected calibration data (e.g., operating a test separator or a multi-phase flow meter) or occasionally shutting in multiple/select wells. More generally, a hybrid approach may be taken that incorporates both a physics-based model in addition to data from actual measurements to construct and train a machine learning model.

BRIEF DESCRIPTION OF THE FIGURES

The present invention is illustrated by way of example and not limitation in the Figures of the accompanying drawings in which.

DESCRIPTION OF THE EMBODIMENTS

Overview

In hydrocarbon production, a well may produce fluids from a subsurface formation to production equipment on the surface. As hydrocarbons are produced, operators may need to know production amounts (e.g., oil, water, and gas) from the well. Some implementations of the inventive subject matter utilize a virtual flow meter to determine flow information of a well producing fluid from the subsurface formation.

Some implementations may obtain production measurements from a well. For example, pressure measurements and temperature measurements may be obtained from pressure sensors and temperature sensors, respectively. Some implementations may utilize additional production measurements suitable for determining flow information, such as production system measurements, fluid properties, flow control valve measurements, etc. Some implementations may obtain, with a sensor, measurements generated by the fluid flowing through a device. For example, an acoustic device may generate an acoustic signal as fluid flows through the acoustic device. A sensor, such as a fiber optic cable, pressure sensor, motion sensor, etc. may obtain the measurement of the acoustic signal. After obtaining at least one production measurement and a fiber optic measurement, both the production measurement(s) and the fiber optic measurement may be input into a virtual flow meter. After receiving the production measurements and fiber optic measurements, the virtual flow meter may provide results indicating the multi-phase flow rate of the fluid. Hence, the virtual flow meter can indicate a multi-phase flow rate of the fluid produced by the well.

In some implementations, the multi-phase flow rate of the fluid may be used to perform a wellbore operation. For example, a wellbore operation may be initiated, modified, or stopped based on the multi-phase flow rate. Examples of such wellbore operations may include triggering alarms, shutting in a well, starting to produce a well, adjusting flow control valves, optimizing wellbore production, future well planning, future completion design, planning of restimulation, etc. For instance, the multi-phase flow rate may indicate fluid production has declined below a volume threshold for the current production system in the wellbore. Accordingly, a new production system may be designed for the current flow rates to optimize production.

Example System

Figure 1:
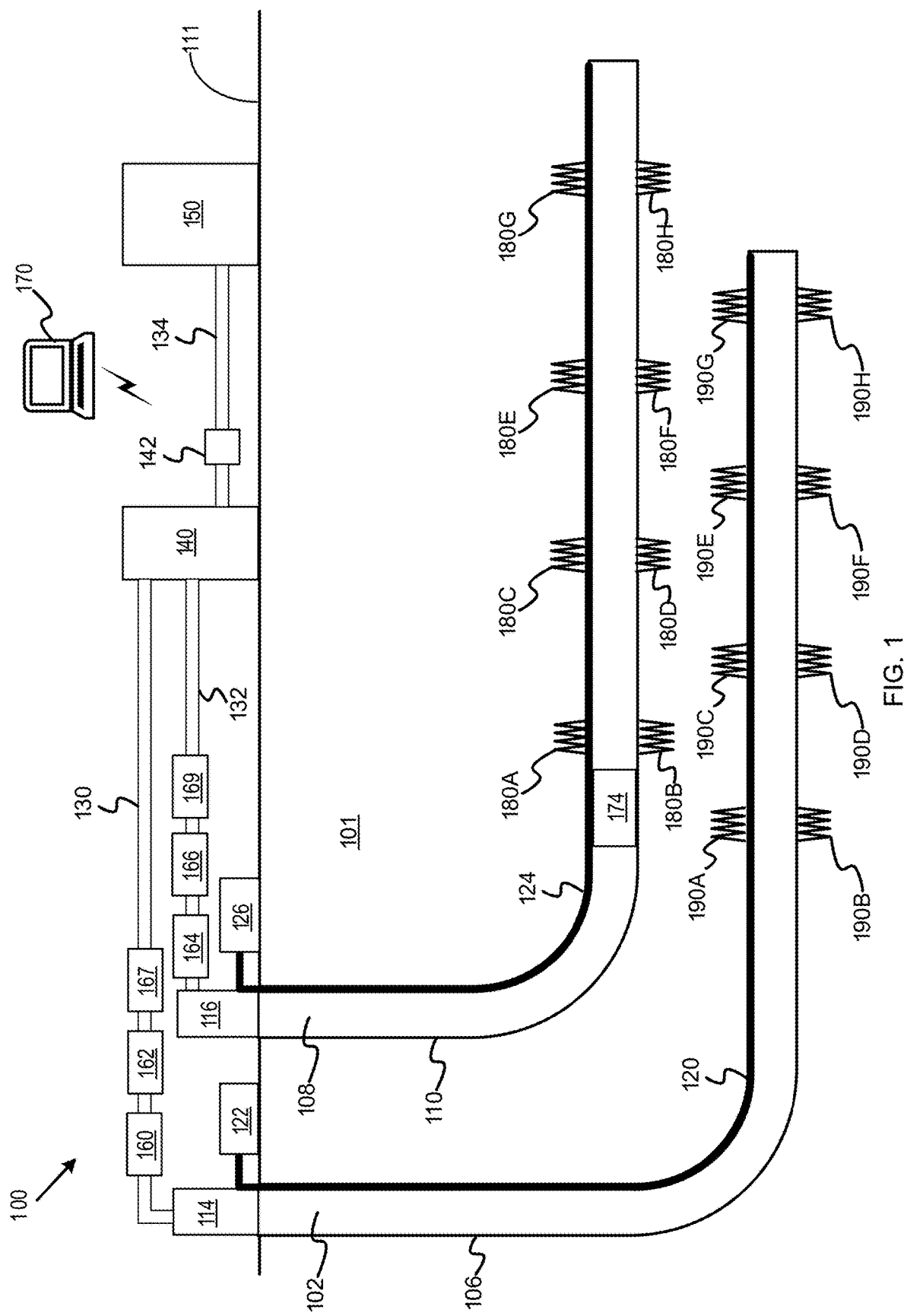
FIG. 1 depicts an example multi-well system, according to some implementations.

FIG. 1 depicts an example multi-well system, according to some implementations. In particular, FIG. 1 is a schematic of a multi-well system 100 that includes a wellbore 102 and a wellbore 108 in a subsurface formation 101. The wellbore 102 includes casing 106 and a number of perforations 190A-190H being made in the casing 106 at different depths to allow reservoir fluids (i.e., oil, water, and gas) from the subsurface formation 101 to flow into the wellbore 102 and ultimately to production equipment on the surface 111. A flowline 130 coupled to the wellhead 114 of wellbore 102 and a separator 140 may allow the fluid produced from the wellbore 102 to flow to the separator 140. Similarly, the wellbore 108 includes casing 110 and a number of perforations 180A-180H being made in the casing 110 to allow reservoir fluids (i.e., oil, water, and gas) from the subsurface formation 101 to flow into the wellbore 108 and ultimately to production equipment on the surface 111. A flowline 132 coupled to a wellhead 116 and the separator 140 may allow the fluid produced from the wellbore 108 to flow to the separator 140 on surface 111. The separator 140 may be designed to separate the phases of the fluid produced from the wellbores 102, 108. For instance, oil, water, and gas, may be separated from each other after passing through the separator 140. The aggregate of fluid produced from wellbores 102, 108 may then flow to a tank battery, via flowline 134, that may include components such as storage tank 150, to store the produced fluid. In this example illustration, FIG. 1 depicts a single flow meter 142 coupled to the flowline 134 to measure the aggregate of flow from wellbores 102, 108. While FIG. 1 depicts a single flowline 134 and a single flow meter 142, multiple flow lines with corresponding flow meters may be coupled to the separator. For instance, oil, water, and gas may be flow downstream of the separator 140 via separate flow lines, and a flow meter may be coupled to each respective flow line to measure the flow of the respective fluid.

Sensors, such as temperature sensors 160, 164 and pressure sensors 162, 166, may be coupled to the respective flowlines 130, 132 to obtain temperature and pressure measurements, respectively. At least one flow meter, such as flow meters 167, 169 may also be coupled to the respective flowlines 130, 132. Each of the flow meters 167, 169 may include one or more acoustic devices. The acoustic devices may include a fluidic oscillator, an asymmetric fluidic oscillator, a multi-port fluidic oscillator, a multi-port asymmetric fluidic oscillator, a hole-tone whistle, etc. Flow meters may also be placed downhole, such as flow meter 174. As fluid flows through the flow meters 167, 169, 174 the respective acoustic devices may generate acoustic signals or other suitable mechanical disturbances including motion, pressure, temperature, etc. The acoustic signals may be measured by sensors, such as fiber optic cables 120, 124. In some embodiments, the acoustic signals (or other suitable mechanical disturbances) may be detected by vibration and/or motion sensing transducers including accelerometers, micro electro-mechanical systems (MEM's) accelerometers, geophones, piezoelectric, etc. In some embodiments, the acoustic signals or any other signals may be detected by pressure sensing transducers including hydrophones, piezoelectric, differential pressure sensors etc. The distribution of sensors shown in FIG. 1 is for example purposes only. Any suitable sensor deployment may be used. For example, the multi-well system 100 may include fiber optic cable deployed sensors or sensors cemented into the casing. Different types of sensors deployments also may be combined in a single well, such as including both sensors cemented to the casing and sensors in plugs, flow metering devices, etc. in a single well system.

The fiber optic cables 120, 124 may be coupled near the fluid flow. For example, the fiber optic cables 120, 124 may be coupled to the respective flowlines 130, 132, to the respective wellheads 114, 116, etc. Additionally, the fiber optic cables 120, 124 may be wrapped around the pipe with the fluid flow or placed on the outer face of the pipe in the axial direction with respect to the pipe. In some embodiments, the fiber optic cables 120, 124 may be coupled to more than piece of equipment associated with a wells. For example, fiber optic cable 120 may be coupled to the flowline 130, the flow meter 167, and the wellhead 114. Additionally, a single fiber optic cable may be coupled to multiple wells. For instance, a fiber optic cable may be coupled to the wellbore 102 and the wellbore 108 via equipment associated with each wellbore such as wellheads 114, 116. In some embodiments, the fiber optic cables 120, 124 may extend and/or be deployed downhole. For example, FIG. 1 depicts fiber optic cables 120, 124 extending from the surface 111 to the subsurface along the wellbore 102 and the wellbore 108, respectively. The fiber optic cables 120, 124 may be cemented in place in the annular space between the casing 106, 110 of the respective wellbores 102, 108 and the subsurface formation 101. The fiber optic cables 120, 124 may be clamped to the outside of the casing 106, 110 during deployment and protected by centralizers and cross coupling clamps. The fiber optic cables 120, 124 may be included with coiled tubing, wireline, loose fiber using coiled tubing, or gravity deployed fiber coils that unwind the fiber as the coils are moved in the wellbores 102, 108. The fiber optic cables 120, 124 also may be deployed with pumped down coils and/or self-propelled containers. Additional deployment options for the fiber optic cables 120, 124 can include coil tubing and wireline deployed coils where the fiber optic cables 120, 124 are anchored at the toe of the wellbore. In such implementations the fiber optic cable 120, 124 can be deployed when the wireline or coiled tubing is removed from the well. The fiber optic cables 120, 124 may house one or more optical fibers, and the optical fibers may be single mode fibers, multi-mode fibers, or a combination of single mode and multi-mode optical fibers. The distribution of sensors shown in FIG. 1 is for example purposes only. Any suitable sensor deployment may be used. For example, the multi-well system 100 may include fiber optic cable deployed sensors or sensors cemented into the casing.

The fiber optic cables 120, 124 may be used for distributed sensing where acoustic, strain, and temperature data may be collected at or near the wellheads 114, 116 of wellbores 102, 108 respectively, at or near the flow lines 130, 132 of wellbores 102, 108 respectively, and downhole in the wellbores 102, 108. The data may be collected at various positions distributed along the fiber optic cable 120, 124. For example, data may be collected every 1-3 ft along the full length of the fiber optic cable 120, 124. Fiber optic interrogation unit 122, 126 of each respective wellbore 102, 108 may be located on the surface 111 of the multi-well system 100. The fiber optic interrogation units 122, 126 may be directly coupled to the fiber optic cables 120, 124. Alternatively, the fiber optic interrogation units 122, 126 may be coupled to a fiber stretcher module, wherein the fiber stretcher module is coupled to the fiber optic cables 120, 124. The fiber optic interrogation unit 122, 126 may receive measurement values taken and/or transmitted along the length of the fiber optic cables 120, 124 such as acoustic, temperature, strain, etc. The fiber optic interrogation units 122, 126 may be electrically connected to a digitizer to convert optically transmitted measurements into digitized measurements.

The fiber optic interrogation units 122, 126 may operate using various sensing principles including but not limited to amplitude-based sensing systems like Distributed Temperature Sensing (DTS), Distributed Acoustic Sensing (DAS), Distributed Vibration Sensing (DVS), and Distributed Strain Sensing (DSS). For example, the DTS system may be based on Raman and/or Brillouin scattering. A DAS system may be a phase sensing-based system based on interferometric sensing using homodyne or heterodyne techniques where the system may sense phase or intensity changes due to constructive or destructive interference. The DAS system may also be based on Rayleigh scattering and in particular coherent Rayleigh scattering. A DSS system may be a strain sensing system using dynamic strain measurements based on interferometric sensors or static strain sensing measurements using Brillouin scattering. DAS systems based on Rayleigh scattering may also be used to detect dynamic strain events. Temperature effects may in some cases be subtracted from both static and/or dynamic strain events, and temperature profiles may be measured using Raman based systems and/or Brillouin based systems capable of differentiating between strain and temperature, and/or any other optical and/or electronic temperature sensors, and/or any other optical and/or electronic temperature sensors, and/or estimated thermal events.

In some implementations, the fiber optic interrogation units 122, 126 may measure changes in optical fiber properties between two points in an optical fiber at any given point, and these two measurement points move along the optical sensing fiber as light travels along the optical fiber. Changes in optical properties may be induced by strain, vibration, acoustic signals and/or temperature as a result of the fluid flow. Phase and intensity based interferometric sensing systems are sensitive to temperature and mechanical, as well as acoustically induced, vibrations. DAS data can be converted from time series data to frequency domain data using Fast Fourier Transforms (FFT) and other transforms, like wavelet transforms, also may be used to generate different representations of the data. Various frequency ranges can be used for different purposes and where low frequency signal changes may be attributed to formation strain changes or fluid movement and other frequency ranges may be indicative of fluid movement. Various techniques may be applied to generate indicators of events related to measure the flow of phases of fluid.

Figure 10:
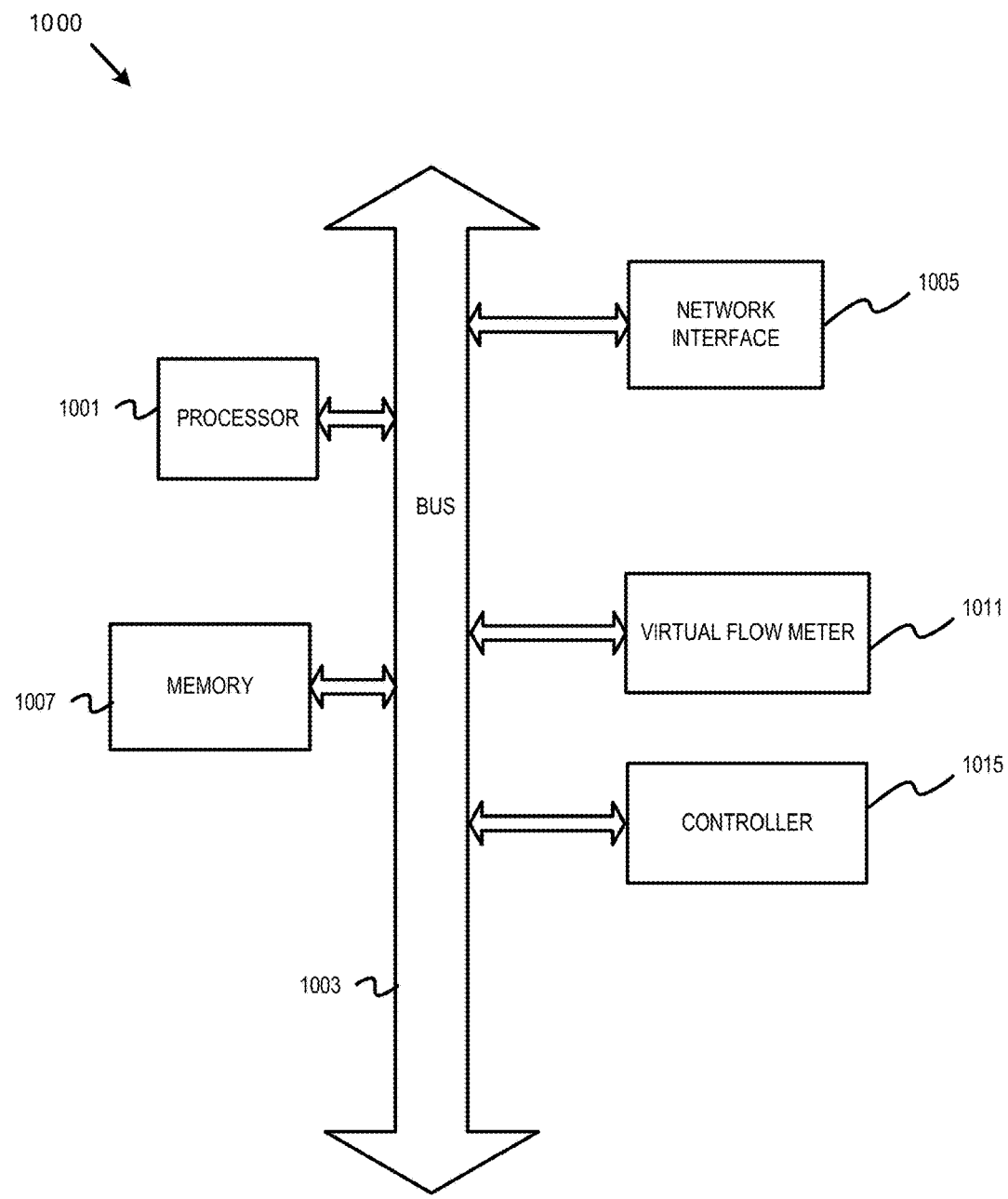
FIG. 10 depicts an example computer, according to some implementations.

A computer 170 may be communicatively coupled to the fiber optic interrogation units 122, 126 and other sensors in the multi-well system 100. The computer 170 may include a signal processor to perform various signal processing operations on signals captured by the fiber optic interrogation units 122, 126 and/or other components of the multi-well system 100. The computer 170 may have one or more processors and a memory device to analyze the measurements and graphically represent analysis results on a display device. The computer may also include a virtual flow meter. The virtual flow meter may include machine-readable instructions that, when executed by a processor, cause the processor to perform operation for configuring a feature set, training itself based on training data, and determining flow rates and multi-phase flow rates as described herein. The virtual flow meter 167 also may be configured to partition the aggregate of flow from the multi-well system 100, measured by flow meter 142. Although FIG. 1 depicts a system with multiple wellbores, embodiments described herein may also be applicable to other systems such as a single well system and a multi-well system that has more than one separator. An example of the computer 170 is depicted in FIG. 10, and further described below.

Figure 2:
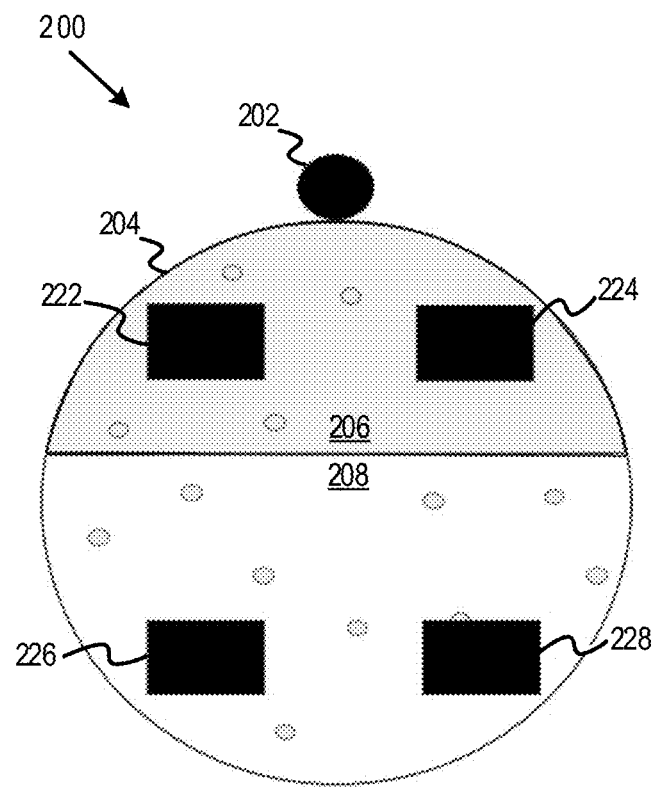
FIG. 2 depicts a cross-section of an example flow meter having multiple acoustic devices, according to some implementations.

FIG. 2 depicts a cross-section of an example flow meter having multiple acoustic devices, according to some implementations. FIG. 2 includes a flow meter 200 comprising a pipe 204 and acoustic devices 222-228. Acoustic devices may include one or more fluidic oscillators, asymmetrical fluidic oscillators, hole-tone whistles, other suitable variable-frequency acoustic devices, or any suitable combination thereof that can receive flowing fluid and generate or propagate acoustic signals. The flow meter 200 may be integrated into various locations of a well including the flowline such as the flowline 130 in FIG. 1 and the casing of an approximately horizontal section of a wellbore such as the casing 110 in FIG. 1. At least one acoustic device. such as acoustic devices 222-228 may be placed inside the pipe 204. In some instances, the acoustic devices 222-228 may be positioned in the flow meter 200 for measuring one or more particular phases of fluid. The acoustic devices 222-228 may be oriented at varying angles relative to the direction of flow to generate variations in the flow rate of the fluid phases. In the example of FIG. 2, the phases of the fluid may include oil 206 and water 208. In this example, because the oil 206 and the water 208 may have different weights, and assuming that the flow meter 200 is positioned to be horizontal or near horizontal, the oil 206 and the water 208 may be essentially separated. Accordingly, the oil 206 may interact with the acoustic devices positioned in the upper half of the flow meter 200—e.g., the acoustic devices 222-224. The water 208 may interact with the acoustic devices positioned in the lower half of the flow meter 200—e.g., acoustic devices 226-228. In some examples, the number of acoustic devices included in respective flow meter 200 may correspond to a number of phases to be measured at the respective flow meter 200. For example, the flow meter 200 may include one acoustic device for measuring a single phase (e.g., oil, water, or gas) of the fluid, and a different flow meter may include three acoustic devices for measuring three phases (e.g., oil, water, and gas) of the fluid, etc.

The variations in the flow rate may result in each acoustic devices 222-228 generating a corresponding acoustic signal, as described above. Each of the acoustic devices 222-228 may be tuned to generate a specific frequency. A sensor 202 (such as a fiber optic cable, a vibration sensing transducer, a pressure sensing transducer, etc.) may be coupled to, near, or inside the pipe 204 to detect the acoustic signals. For example, with reference to FIG. 1, sensor 202 may be coupled to the outside of a casing 106 and cemented in place with the casing 106. Various phase ratios (e.g., the fluid comprises 50% oil and 50% water) and flow rates may produce unique acoustic signals from each of the acoustic devices 222-228. Each of the acoustic signals from the acoustic devices 222-228 that may be detected by the sensor 202 may be combined into a single time series dataset, resulting in the DAS differential phase time domain signal.

Figure 3:
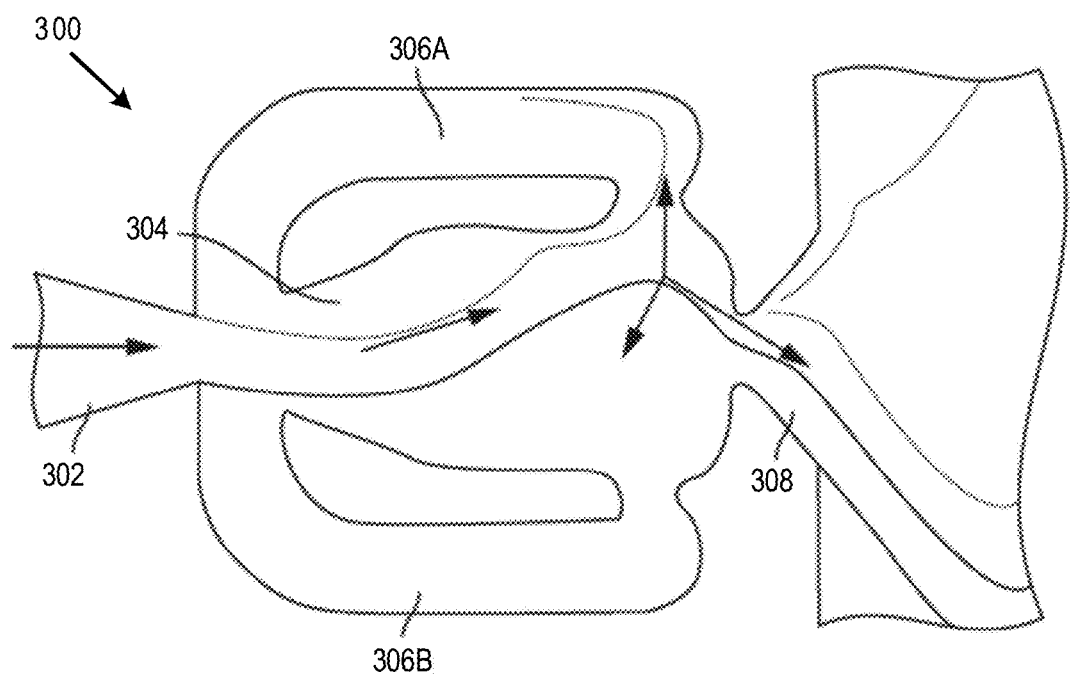
FIG. 3 depicts a diagram of fluid flow with respect to an acoustic device, according to some implementations.

FIG. 3 depicts a diagram of fluid flow with respect to an acoustic device, according to some implementations. The acoustic device 300 may include a fluidic oscillator or other suitable acoustic devices. The acoustic device 300 may include an inlet channel 302, a mixing chamber 304, feedback loops 306A-B, and an outlet channel 308. The inlet channel 302 may be coupled to the mixing chamber 304, which may be coupled to the feedback loops 306A-B and the outlet channel 308. The acoustic device 300 may include other or different suitable components. Additionally, while illustrated as symmetric, the acoustic device 300 may be asymmetric or otherwise include an asymmetric feature. For example, the outlet channel 308 or other suitable feature of the acoustic device 300 may be asymmetric.

Fluid may be directed into the acoustic device 300 via the inlet channel 302. The fluid may travel into the mixing chamber 304, and the fluid may oscillate. For example, the fluid may oscillate in the mixing chamber 304, by traveling through one or more of the feedback loops 306A-B, by flowing through the outlet channel 308, etc. The frequency of oscillation of the fluid may depend on various factors. For example, the frequency of oscillation of the fluid may be a linear function of the flow rate of the fluid. Additionally, or alternatively, the frequency of oscillation of the fluid may depend on a pressure drop, such as the square root of the pressure drop, in the acoustic device 300. The frequency of the oscillation or the pressure drop for a given flow rate may be different for fluids with different properties like e.g. density. In some embodiments, differential pressure sensors may measure the pressure drop and oscillation frequency as fluid flows through the acoustic device 300. A combination of measured pressure drop and oscillation frequency across the acoustic device may enable fluid phase identification and quantification for a given flow condition. For instance, a differential pressure sensor may measure pressure near the inlet channel 302 and pressure near the outlet channel 308 to determine the pressure drop of the fluid as it flows through the acoustic device 300. The differential pressure senor may be coupled to the acoustic device 300 or near the acoustic device 300 (such as on the flowline 130, 132 of FIG. 1) The frequency of oscillation may depend on other suitable factors relating to the acoustic device 300. In some examples, the oscillation of the fluid in the acoustic device 300 may cause acoustic signals to be generated or propagated.

Figure 4:
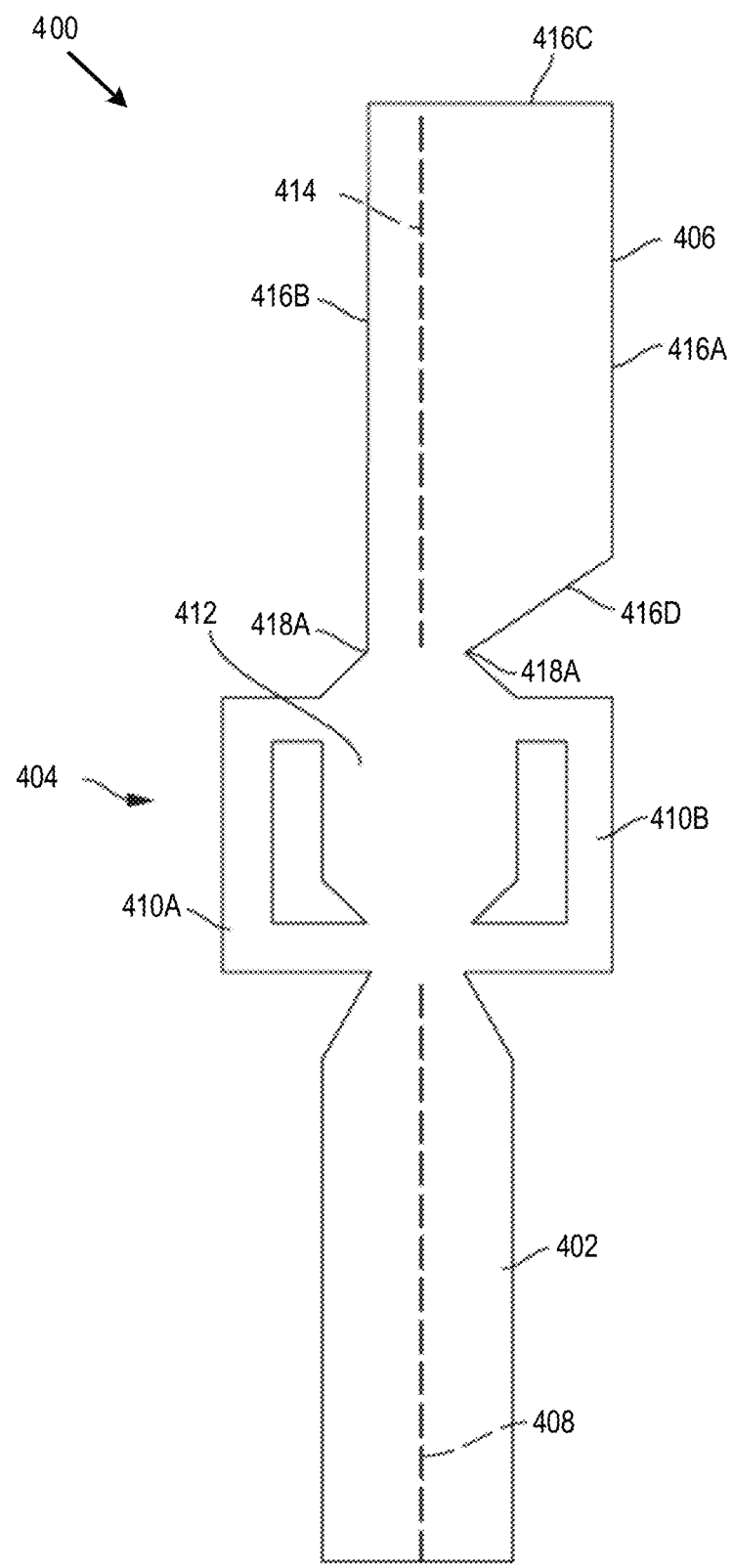
FIG. 4 depicts a diagram of an asymmetric fluidic oscillator, according to some implementations.

FIG. 4 depicts a diagram of an asymmetric fluidic oscillator, according to some implementations. The asymmetric fluidic oscillator 400 may be an acoustic device included in the flow meters 167, 169, 174 illustrated in FIG. 1. The asymmetric fluidic oscillator 400 may include an inlet channel 402, a feedback system 404, an outlet channel 406, and any other suitable components.

The inlet channel 402 may include a receiving path in the asymmetric fluidic oscillator 400. For example, the inlet channel 402 may receive fluid (e.g., from the flowline 130 of FIG. 1 or other suitable components of the wellbore 102) that may originate upstream from the asymmetric fluidic oscillator 400, and the inlet channel 402 may direct the fluid further into the asymmetric fluidic oscillator 400 such as into the feedback system 404. As illustrated in FIG. 4, the inlet channel 402 is symmetric about axis 408, but the inlet channel 402 may be symmetric about other axes or asymmetric.

The feedback system 404 may be coupled to the inlet channel 402, the outlet channel 406, other suitable components, or a combination thereof. The feedback system 404 may include a first feedback loop 410a, a second feedback loop 410b, a mixing chamber 412, any other suitable components, or a combination thereof. Additionally, the feedback system may be otherwise suitably shaped or configured. For example, the feedback system 404 may include more or fewer feedback loops 410, a differently sized or shaped mixing chamber 412, differently shaped or sized feedback loops 410, etc. for oscillating the fluid.

The outlet channel 406 may be coupled to the feedback system 404. For example, the outlet channel 406 may be coupled to the feedback loops 410A-B, the mixing chamber 412, etc. The outlet channel 406 may define an exit path for fluid received from the feedback system 404. For example, fluid may be received from the feedback system 404 by the outlet channel 406, which may direct the fluid out of the asymmetric fluidic oscillator 400. The outlet channel 406 may be asymmetric. For example, the outlet channel 406 may not be symmetric along any suitable axes of the outlet channel 406. As illustrated, the outlet channel 406 is not symmetric about axis 414, which may be similar or identical to the axis 408 of the inlet channel 402. The asymmetric nature of the outlet channel 406 may cause disruptions or other variations in the flow of fluid passing through the outlet channel 406. For example, the asymmetry of the outlet channel 406 may interrupt the natural flow of the fluid, and the interruption may cause vibrations or other suitable acoustic signals that may be larger or that otherwise may include higher intensities than signals produced from other fluidic oscillators.

Figure 5:
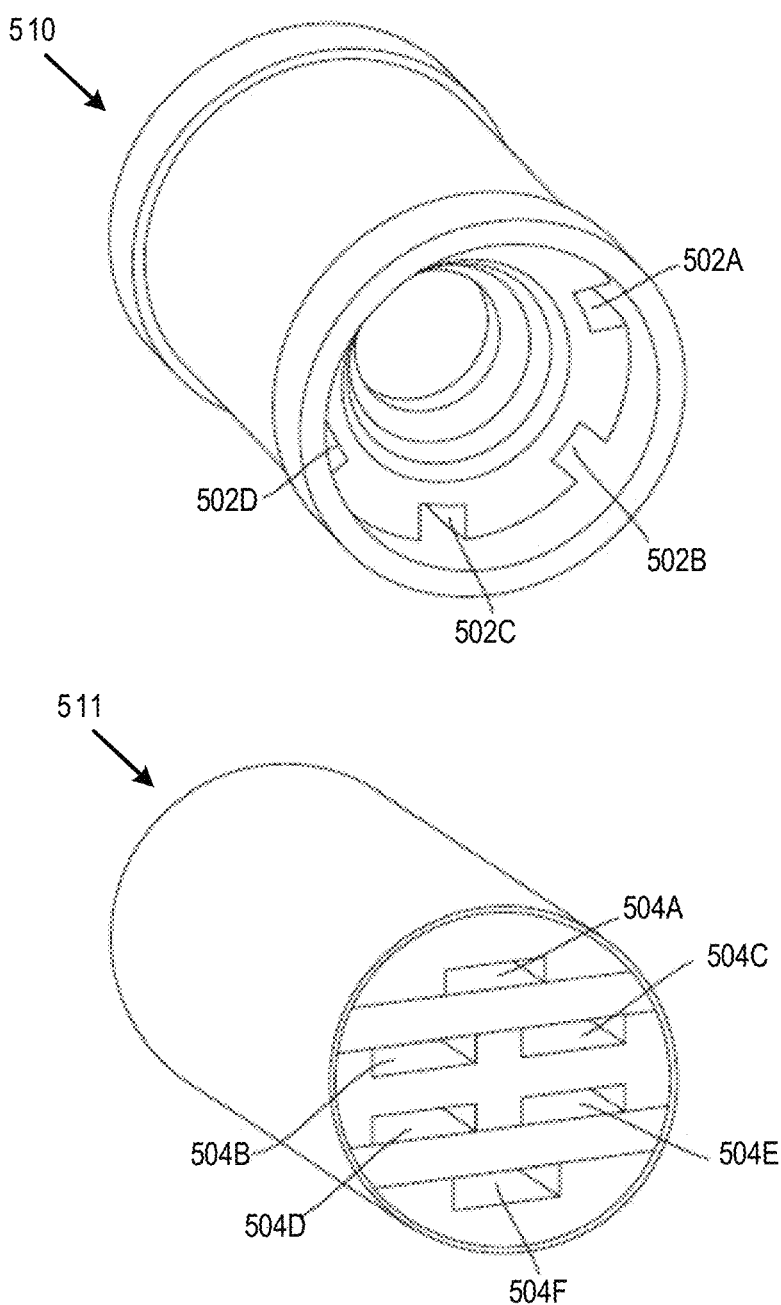
FIG. 5 depicts a perspective view of two examples of flow meters, according to some implementations.

The outlet channel 406 may be an irregularly shaped quadrilateral or any other suitable irregular or asymmetric shapes (e.g., an irregular pentagon, a regular quadrilateral having jagged edges, etc.). The outlet channel 406 may include a right side 416A, a left side 416B, a top side 416C, and a bottom side 416D. The right side 416A may be connected to the bottom side 416D and to the top side 416C, the left side 416B may be connected to the top side 416C and to the feedback system 404, and the bottom side 416D may be connected to the feedback system 404. The right side 416A and the left side 416B may be substantially parallel to one another. In other examples, the right side 416A and the left side 416B may be non-parallel. Additionally, the top side 416C and the bottom side 416D may be non-parallel for forming the asymmetric feature of the outlet channel 406. In some examples, the asymmetric feature can be formed via the bottom side 416D coupling to the feedback system 404 in a first location 218A, while the left side 416B is coupled in a second location 418B to the feedback system 404. Accordingly, the right side 416A may be shorter than the left side 416B, and the bottom side 416D may include a defined and non-zero slope FIG. 5 depicts a perspective view of two examples of flow meters, according to some implementations. As illustrated, the flow meters 510, 511 each include six acoustic devices, such as acoustic device 300 of FIG. 3. The acoustic devices may be arranged circumferentially (e.g., on a circumference) with respect to the flow meter 510, and the acoustic devices may be arranged in a stacked arrangement with respect to the flow meter 511. The flow meters 510, 511 depict six flow channels for directing flowing fluid to respective acoustic devices. Four of the flow channels 502A-D of the flow meter 510 are illustrated, and the flow channels 504 A-F of the flow meter 511 are illustrated. Other suitable numbers (e.g., less than six or more than six) of acoustic devices may be included in the flow meters 510, 511.

In some examples, one or more of the acoustic devices may be matching. For example, the flow meter 511 may include three pairs of matching acoustic devices. As illustrated, a first matching pair may correspond to acoustic devices of the flow channels 504A-B, a second matching pair may correspond to acoustic devices of the flow channels 504E-F, and a third matching pair may correspond to acoustic devices of the flow channels 504C-D. Other suitable matching pairs, including different numbers of matching pairs, and the like, are possible. A matching pair of acoustic devices may indicate that the respective acoustic devices are of the same design, size, and frequency response with respect to fluid flow. For example, a similar fluid flowing through a matching pair of acoustic devices would yield the same or essentially the same signal response. Accordingly, a similarity (or a difference between) fluids flowing through the matching pairs of acoustic devices may be resolved or otherwise determined. For example, if two different signals are received at two matching acoustic devices, respectively, then the fluid flowing through a first of the matching acoustic devices may be different than the fluid flowing through the second of the matching acoustic devices. A degree of difference in the acoustic signals between the matching pair of acoustic devices may be used to resolve the degree of difference between the two different types of fluid flowing through the matching acoustic devices. For example, the degree of difference can involve determining whether a fluid density, a fluid viscosity, or other characteristics of the two fluids are different.

Figure 6:
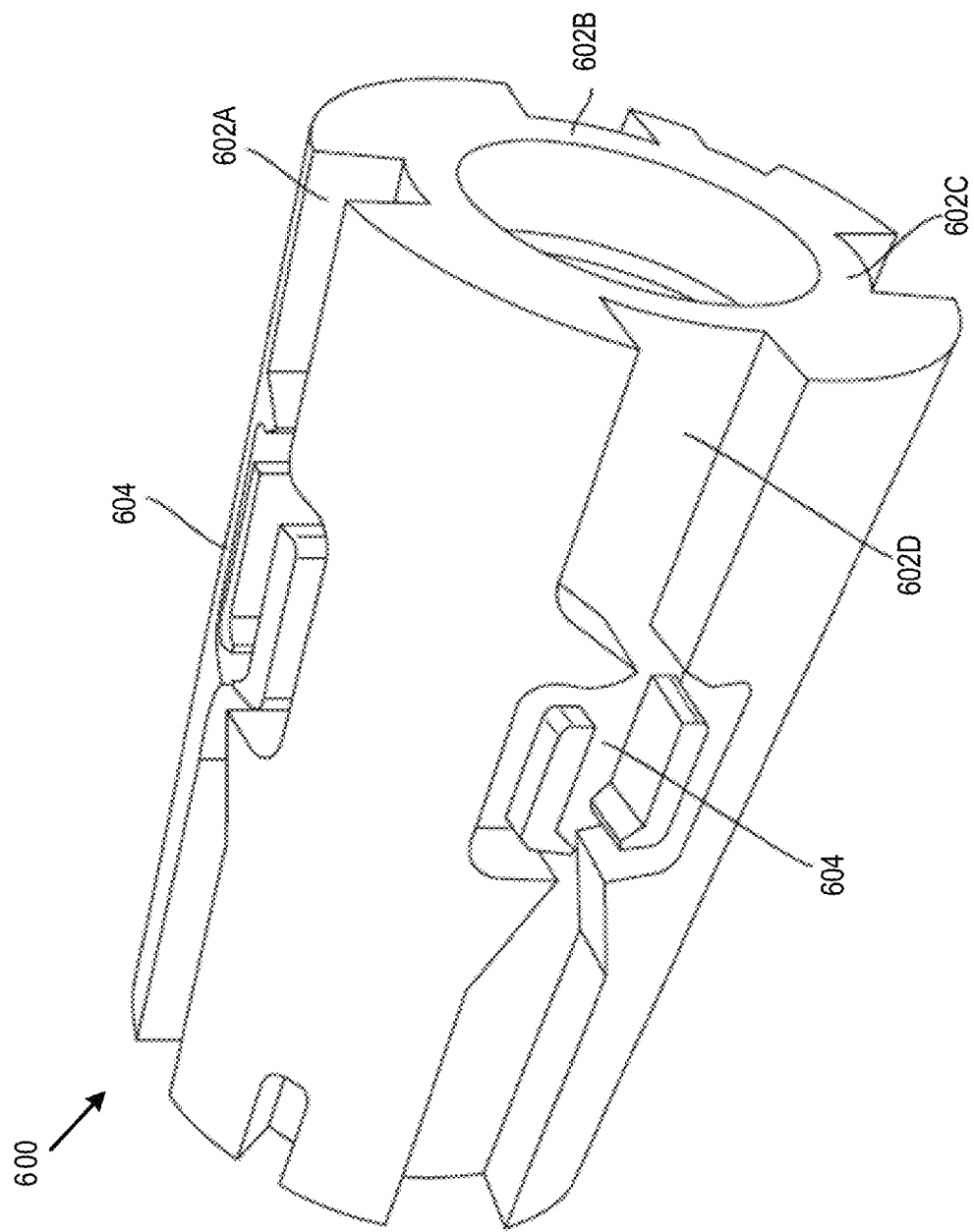
FIG. 6 depicts a perspective view of an example of a flow meter with exterior acoustic devices, according to some implementations.

FIG. 6 depicts a perspective view of an example of a flow meter with exterior acoustic devices, according to some implementations. The flow meter 600 may include four flow channels 602A-D, which may each direct flowing fluid to a respective acoustic device 604 of the flow meter 600. Other suitable numbers (e.g., less than four or more than four) of flow channels may be included in the flow meter 600. The flow channels 602A-D may be positioned on an exterior of the flow meter 600. For example, the flow channels 602A-D may cause fluid flowing in the wellbore to flow between the flow meter 600 and a conduit or tubular of the wellbore.

Example Operations

This section describes operations associated with some implementations of the invention. In the discussion below, the flow diagrams may be described with reference to the example system presented above. In certain implementations, the operations are performed by executing instructions residing on machine-readable media (e.g., software), while in other implementations, the operations are performed by hardware and/or other logic (e.g., firmware). In some implementations, the operations are performed in series, while in other implementations, one or more of the operations can be performed in parallel. Moreover, some implementations perform less than all the operations shown in the flow diagrams.

Figure 7:
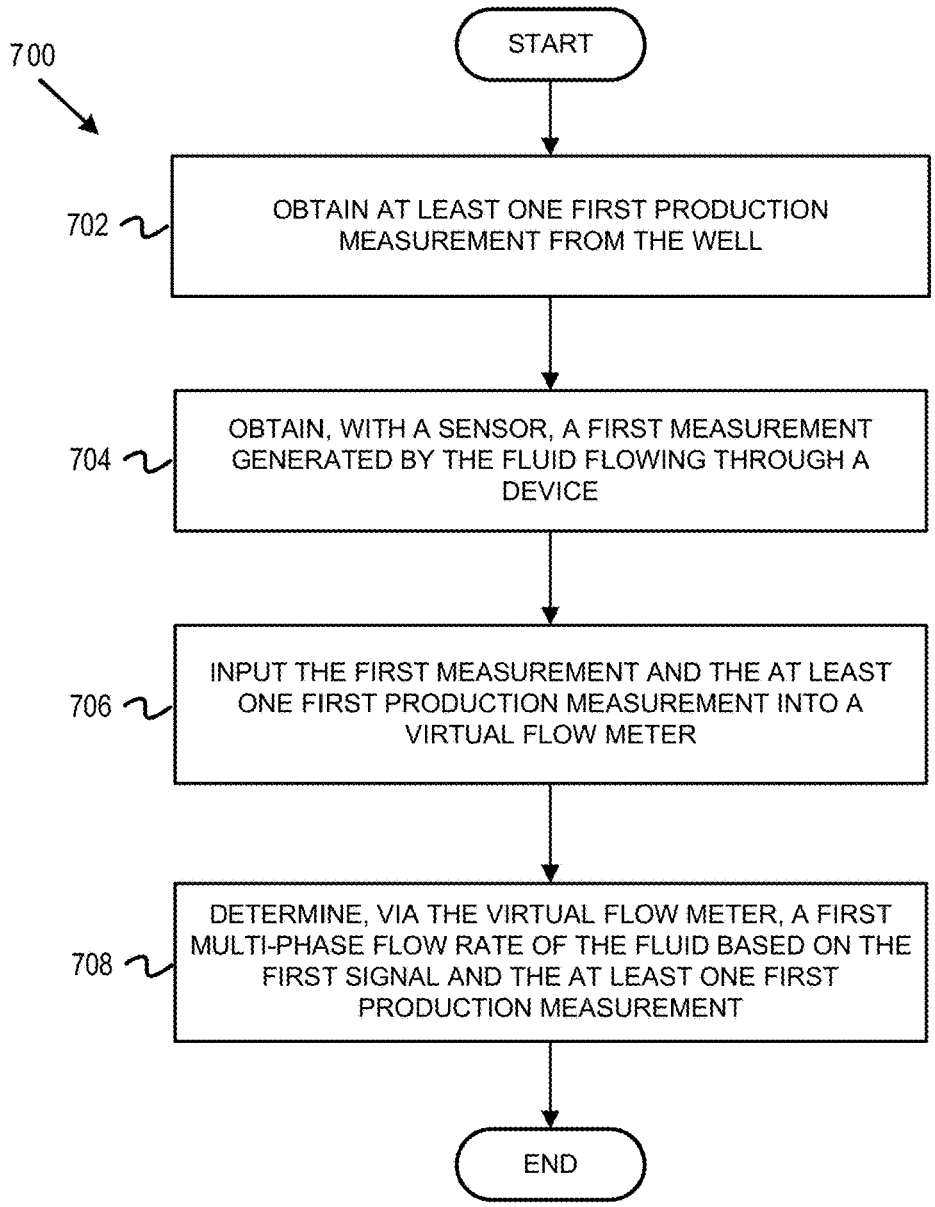
FIG. 7 depicts a flowchart of example operations for running a virtual flow meter on a measurement sample, according to some implementations.

FIG. 7 depicts a flowchart of example operations for running a virtual flow meter on a measurement sample, according to some implementations. FIG. 7 includes a flowchart 700 that may output multi-phase flow rates based on measurement samples of a well. Operations of flowchart 700 of FIG. 7 are described in reference to computer 170 of FIG. 1. Operations of the flowchart 700 start at block 702.

At block 702, at least one production measurement may be obtained from a well. For example, with reference to FIG. 1, a processor of the computer 170 may obtain the production measurements. Production measurements may include measurements and data associated with flow from a wellbore. For instance, sensors, such as pressure sensors 162 and temperature sensors 160 of FIG. 1, may be available to obtain measurements such as pressure and temperature, respectively. Production measurements may include equipment settings. For instance, the surface production equipment of a well may include a choke manifold with a flow control valve. The processor of computer 170 may obtain the position of the flow control valve as a production measurement. Production measurements may include measurements and settings from production systems in the wellbore of a well. For example, an electric submersible pump (ESP) may be disposed in a wellbore. Measurements from the ESP such as inlet pressure, outlet pressure, motor amperage, operating frequency, etc. may be obtained as production measurements. Production measurements from other production systems including gas lift, rod pump, plunger lift, etc. may also be obtained. Measurements made by a single and multi-phase flow meter may be obtained. For instance, with reference to FIG. 1, measurements made by multi-phase flow meter 142 downstream of the separator may be obtained as a production measurement. Additionally, production measurements may include fluid properties. For example, the specific gravity of the fluids, viscosity of the oil, bubble point, etc. may be obtained as a production measurement.

At block 704, a first measurement generated by fluid flowing through a device may be obtained by a sensor. For example, with reference to FIG. 1, a processor of the computer 170 may obtain the measurement. The measurement may include a fiber optic measurement such as an acoustic measurement, a temperature measurement, etc. measured by a fiber optic cable as described in FIG. 1 and FIG. 2. For example, a flow meter of a well may include one or more acoustic devices as described in FIGS. 1-6. As fluid from the wellbore flows through the flow meter, signals, such as acoustic signals, may be generated and propagated. The signals may then be detected and measured by a fiber optic cable. The signals may be measured by other sensors suitable for detecting signals generated by the flow meter including a vibration sensing transducer, a pressure sensing transducer, etc. The measurements of the signals may be obtained by a processor of computer 170 and processed into an acceptable format for virtual flow metering. Processing of the measurements is described in FIG. 9.

At block 706, the first measurement and the at least one production measurement may be input into the a virtual flow meter. For example, with reference to FIG. 1, a processor of the computer 170 may obtain perform this operation. The virtual flow meter may be configured to receive, as input, a measurement and at least one production measurement. Configuration of the virtual flow meter will be described in FIG. 8.

At block 708, a multi-phase flow rate of the fluid may be determined, via the flow meter, based on the measurement and the at least one production measurement. For example, with reference to FIG. 1, a processor of the computer 170 may obtain make this determination. A multi-phase flow rate may include the volume of each phase of the fluid over a period of time. For instance, the multi-phase flow rate may indicate the volume of oil, water, and gas produced every hour, 12 hours, 24 hours, etc. The virtual flow meter may include a physics-based model, a machine-learning model, and a hybrid model (i.e., any suitable combination of a physics-based model and a machine-learning model). A physics-based model may include computations that may model physical properties of the fluid flowing from the well. For instance, a physics-based model may determine a multi-phase flow rate based on a system of pipes, valves, separators, production systems, etc. A machine-learning model may include configuring and training a learning machine to determine a multi-phase flow rate of a well based on a feature set. Configuration and training of a machine-learning model will be described in FIGS. 8-9.

The virtual flow meter may determine the flow rate and a multi-phase flow rate of a well based on at least one production measurement and at least one measurement generated by flow through a device. For example, the virtual flow meter may determine a well produces 100 barrels per day (bpd) of total fluid. Additionally, the virtual flow meter may determine the well makes 25 bpd of oil, 75 bpd of water, and 100 thousand standard cubic feet (mscf) of natural gas. In some embodiments, the virtual flow meter may determine a phase flow ratio of the fluid. For instance, the virtual flow meter may determine that flow has a phase flow ratio of 0.75 water (75% water) and 0.25 oil (25% oil).

Although FIG. 7 describes operations that determine multi-phase flow rates for a single well, some implementations may perform operations of the flowchart 700 for a well in a group of wells. For example, the virtual flow meter may receive measurements for each well and may provide a multi-phase flow rate for each of the wells in the group of wells. For example, with reference to FIG. 1, flow from a group of well may aggregate into a single separator. The virtual flow meter may receive inputs (i.e., production measurements and fiber optic measurements) associated with each well and determine the multi-phase flow rate from each well. The flowchart 700 ends after block 708.

In some implementations, the multi-phase flow rate may be stored or reported. For example, the multi-phase flow rate may be reported to mobile devices, email, SCADA, databases, etc. to determine if a wellbore operation is needed.

Figure 8:
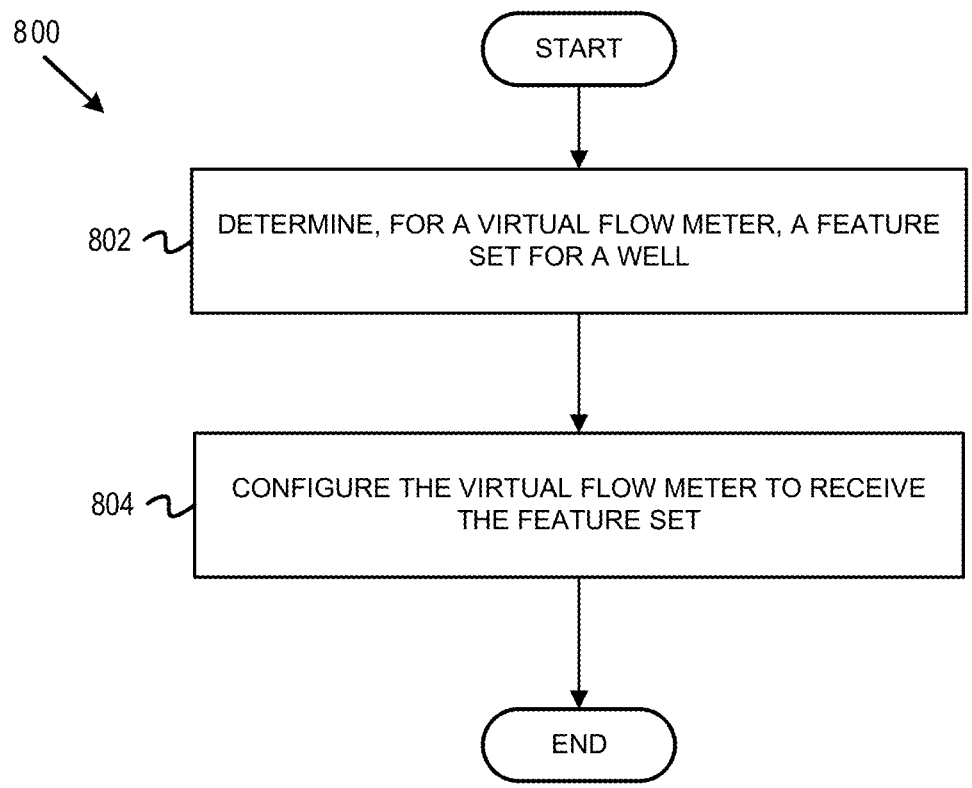
FIG. 8 depicts a flowchart of example operations to configure a virtual flow meter, according to some implementations.

FIG. 8 depicts a flowchart of example operations to configure a virtual flow meter, according to some implementations. FIG. 8 includes a flowchart 800 that may determine a feature set of a well, and may configure the virtual flow meter to receive the feature set as input. Operations of flowchart 800 of FIG. 8 are described in reference to the computer 170 of FIG. 1. Operations of the flowchart 800 start at block 802.

At block 802, a feature set for a well may be determined for the virtual flow meter. For example, with reference to FIG. 1, a processor of the computer 170 may make this determination. The feature set may include a production measurement feature, a measurement feature, a multi-phase flow rate feature, etc. A production measurement feature may include features associated with the flow such as sensor measurements, production system measurements, flow control valve position, fluid properties, etc. The measurement feature may include fiber optic measurements such as power spectral density. Power spectral density may be obtained in the time domain through fiber optic signal acquisition systems and converted to the frequency domain to compute the power spectral density. Power spectral density may be derived from acoustic signals generated by one or more acoustic devices of a flow meter. Processing of the fiber optic measurements and generating power spectral density will be described in FIG. 9 Some implementations may utilize any suitable feature set including any suitable value related to the well and reservoir models related to the well.

At block 804, the virtual flow meter may be configured to receive the feature set as input. For example, with reference to FIG. 1, a processor of the computer 170 may perform this configuration. For instance, the virtual flow meter may include a physics-based model, a machine learning-based model, and any suitable combination of the physics-based model and the machine learning-based model. As noted, the features may include a production measurement feature, a measurement feature, and a multi-phase flow rate feature. The flowchart 800 ends after block 804.

After block 804, the virtual flow meter may begin training itself based on training samples. The discussion of FIG. 9 provides additional details about training samples and training the virtual flow meter.

Figure 9:
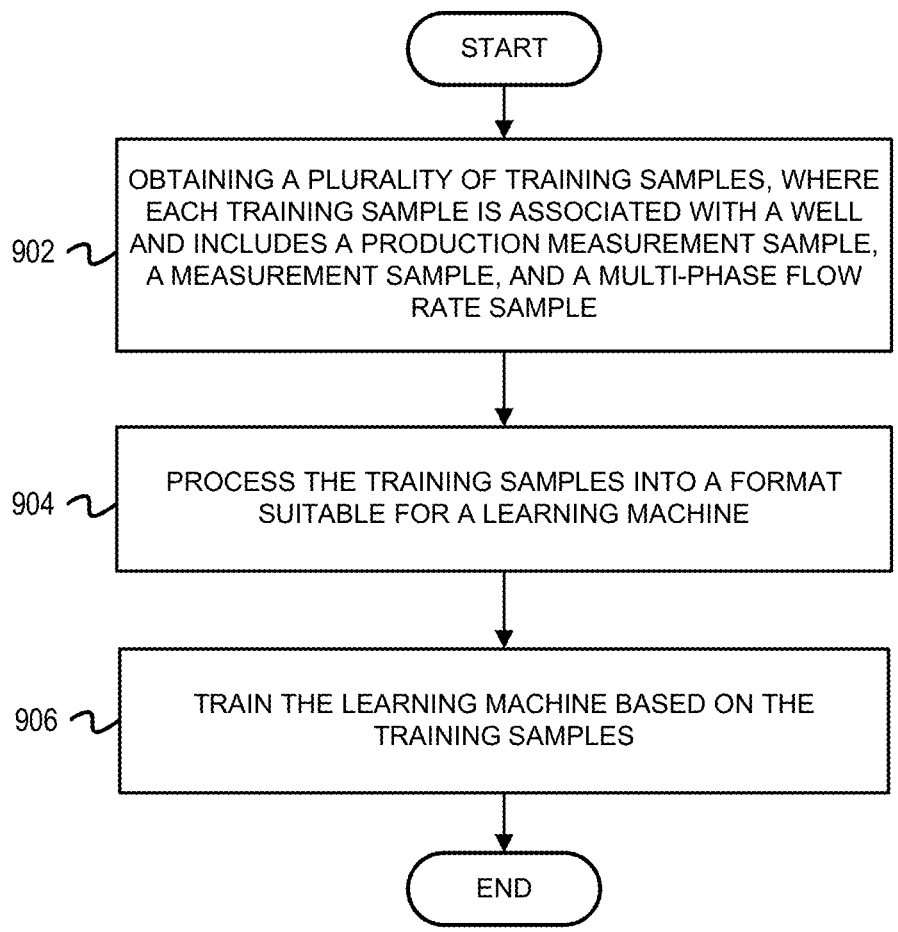
FIG. 9 depicts a flowchart of example operations to train a virtual flow meter, according to some implementations.

FIG. 9 depicts a flowchart of example operations to train a virtual flow meter, according to some implementations. FIG. 9 includes a flowchart 900 that may train a virtual flow meter with training samples. Operations of flowchart 900 of FIG. 9 are described in reference to the computer 170 of FIG. 1. Operations of the flowchart 900 start at block 902.

At block 902, a plurality of training samples may be obtained. For example, with reference to FIG. 1, a processor of the computer 170 may obtain the training samples. Each training sample may be associated with a well. The training samples may include a production measurement sample, a measurement sample, and a multi-phase flow rate sample. The training samples may be generated by software and systems based on the system level design, numerical modeling, sample measurements, etc. The training samples may also be generated by well testing. For example, a well may flow through a test-separator or multi-phase flow meter to obtain the multi-phase flow rate sample and corresponding production measurement samples and measurement samples. In some instances, multiple wells may flow into a single separator. All of the wells except one may be shut in such that only the one well flows into the separator and a multi-phase flow rate sample of the well may be obtained. Some implementations may utilize any suitable technique to obtain training samples.

At block 904, the training samples may be processed into a format suitable for a virtual flow meter. For example, with reference to FIG. 1, a processor of the computer 170 may process the training samples. For instance, the virtual flow meter may accept inputs of DAS data as scaled power spectral density data. DAS data may initially be obtained as DAS differential phase time domain signals. The DAS data may be down sampled to a Nyquist frequency (e.g., a Nyquist frequency of 125 Hz) with an anti-alias filter applied. The down-sampled DAS data may then be converted to the frequency domain, using techniques such as Fourier Transform, to determine the power spectral density. Two-dimensional (2D) filtering may be applied to the power spectral density to remove noise in the frequencies. Techniques to filter the power spectral density may include median filtering, singular value decomposition filtering, and notch filtering. The filtered power spectral density data may be scaled such that it may be suitable for the virtual flow meter. For example, the discrete values of the power spectral density may be scaled to values between 0 and 1. In some implementations, other values of a training sample, such as a production measurement sample, also may be scaled to a value that is suitable for the virtual flow meter. For instance, if the virtual flow meter is configured to accept inputs with values between 0 and 1, the production measurement sample may be scaled to values that between 0 and 1.

At block 906, the virtual flow meter may be trained based on the training samples. For example, with reference to FIG. 1, a processor of the computer 170 may perform this operation. The virtual flow meter may use fewer than all the training samples in its training process. For example, the virtual flow meter may utilize 80% of the training samples at block 906. Later, the virtual flow meter may use the remaining 20% of the training samples to test the virtual flow meter. The virtual flow meter may be updated (i.e., trained) as new training samples are obtained. For instance, the virtual flow meter may be trained with updated training samples obtained by a well test.

In some implementations, inaccuracies may be included in the training samples to train robustness into the virtual flow meter. For instance, if a sensor were to fail or be faulty, the virtual flow meter would be trained to output multi-phase flow rates without the missing or faulty sensor data. In some implementations, the virtual flow meter may be trained to output the multi-phase flow rates for different zones in a pad-based completion. In some implementations, the virtual flow meter may be updated with simulation data that encapsulates the interaction of multiple wells and multiple completions. The flowchart 900 ends after block 906.

Example Computer System

FIG. 10 depicts an example computer, according to some implementations. FIG. 10 depicts a computer 1000 that includes a processor 1001 (possibly including multiple processors, multiple cores, multiple nodes, and/or implementing multi-threading, etc.). The computer 1000 includes a memory 1007. The memory 1007 may be system memory or any one or more of the above already described possible realizations of machine-readable media. The computer 1000 also includes a bus 1003 and a network interface 1005.

The computer 1000 also includes a virtual flow meter 1011 and a controller 1015. The virtual flow meter 1011 and the controller 1015 can perform one or more of the operations described herein. For example, the virtual flow meter 1011 may be configured to utilize a feature set including at least one production measurement, a first measurement and/or any other suitable information. The virtual flow meter 1011 may perform operations for training itself based on training samples related to the feature set. The virtual flow meter 1011 may output the multi-phase flow rate of fluid produced from a well. The controller 1015 can perform various control operations to a wellbore operation based on the output from the processor 1001. For example, the controller 1015 can perform an operation downhole based on the phase-flow ratios of well.

Any one of the previously described functionalities may be partially (or entirely) implemented in hardware and/or on the processor 1001. For example, the functionality may be implemented with an application specific integrated circuit, in logic implemented in the processor 1001, in a co-processor on a peripheral device or card, etc. Further, implementations may include fewer or additional components not illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 may be coupled to the processor 1001.

While the aspects of the disclosure are described with reference to various implementations and exploitations, these aspects are illustrative and the scope of the claims is not limited to them. In general, techniques for utilizing machine learning for sensing flow in one or more wells are described herein may be implemented with facilities consistent with any hardware system or hardware systems. Many variations, modifications, additions, and improvements are possible.

Plural instances may be provided for components, operations or structures described herein as a single instance. Boundaries between various components, operations, and data stores may differ from those described herein. Particular operations may be illustrated in the context of specific example configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

This description includes example systems, methods, techniques, and program flows that embody aspects of the disclosure. However, this disclosure may be practiced without these specific details. For instance, this disclosure refers to features of a feature set of independent variables that may include temperature, pressure, and fiber optic measurements. Aspects of this disclosure can also be applied to any other types of features. In other instances, well-known instruction instances, protocols, structures, and techniques have not been shown in detail in order not to obfuscate the description.

Example Implementations

Embodiment #1: A computer-implemented method for determining flow information of a well producing fluid from a subsurface formation comprising: obtaining at least one first production measurement from the well; obtaining, with a sensor, a first measurement generated by the fluid flowing through a device; inputting the first measurement and the at least one first production measurement into a virtual flow meter; and determining, via the virtual flow meter, a multi-phase flow rate of the fluid based on the first measurement and the at least one first production measurement.

Embodiment #2: The method of Embodiment #1 further comprising: determining, for the virtual flow meter, a feature set for the well, wherein the feature set includes a production measurement feature and a measurement feature; configuring the virtual flow meter to receive the feature set as input; and training the virtual flow meter based on training samples, wherein each training sample is associated with the well, wherein each training sample includes a production measurement sample and a measurement sample.

Embodiment #3: The method of Embodiment #2 wherein the feature set further includes a multi-phase flow rate feature, further comprising: training, during operation, the virtual flow meter based on the multi-phase flow rate, the at least one first production measurement, and the first measurement.

Embodiment #4: The method of Embodiments #2 or #3, wherein determining the multi-phase flow rate includes utilizing the first measurement and the at least one first production measurement in computations that model physical properties of the fluid flowing from the well.

Embodiment #5: The method of any one or more of Embodiments #1-4 further comprising: performing a wellbore operation based on the multi-phase flow rate.

Embodiment #6: The method of any one or more of Embodiments #1-5, wherein the sensor includes a fiber optic cable, a vibration sensing transducer, or a pressure sensing transducer.

Embodiment #7: The method of any one or more of Embodiments #1-6 further comprising: obtaining a fiber optic measurement, wherein determining, via the virtual flow meter, the multi-phase flow rate of the fluid is further based on the fiber optic measurement.

Embodiment #8: The method any one or more of Embodiments #1-7, wherein the at least one first production measurement includes pressure and temperature.

Embodiment #9: A non-transitory computer-readable medium including computer-executable instructions comprising: instructions to obtain at least one first production measurement from the well producing fluid from a subsurface formation; instructions to obtain, with a sensor, a first measurement generated by the fluid flowing through a device; instructions to input the first measurement and the at least one first production measurement into a virtual flow meter; and instructions to determine, via the virtual flow meter, a multi-phase flow rate of the fluid based on the first measurement and the at least one first production measurement.

Embodiment #10: The non-transitory computer-readable medium of Embodiment #9 further comprising: instructions to determine, for the virtual flow meter, a feature set for the well, wherein the feature set includes a production measurement feature and a measurement feature; instructions to configure the virtual flow meter to receive the feature set as input; and instructions to train the virtual flow meter based on training samples, wherein each training sample is associated with the well, wherein each training sample includes a production measurement sample and a measurement sample.

Embodiment #11: The non-transitory computer-readable medium of Embodiment #10 wherein the feature set further includes a multi-phase flow rate feature, further comprising: instructions to train, during operation, the virtual flow meter based on the multi-phase flow rate, the at least one first production measurement, and the first measurement.

Embodiment #12: The non-transitory computer-readable medium of Embodiments #10 or #11, wherein determining the multi-phase flow rate includes utilizing the first measurement and the at least one first production measurement in computations that model physical properties of the fluid flowing from the well.

Embodiment #13: The non-transitory computer-readable medium of any one or more of Embodiments #9-12 further comprising: instructions to perform a wellbore operation based on the multi-phase flow rate.

Embodiment #14: The non-transitory computer-readable medium of any one or more of Embodiments #9-13, wherein the sensor includes a fiber optic cable, a vibration sensing transducer, or a pressure sensing transducer.

Embodiment #15: The non-transitory computer-readable medium of any one or more of Embodiments #9-14 further comprising: instructions to obtain a fiber optic measurement, wherein determining, via the virtual flow meter, the multi-phase flow rate of the fluid is further based on the fiber optic measurement.

Embodiment #16: The non-transitory computer-readable medium of any one or more of Embodiments #9-15, wherein the at least one first production measurement includes pressure and temperature.

Embodiment #17: A system comprising: a sensor; a device; a processor, and a computer-readable medium having instructions stored thereon that are executable by the processor, the instructions including instructions to obtain at least one first production measurement from the well producing fluid from a subsurface formation; instructions to obtain, with the sensor, a first measurement generated by the fluid flowing through the device; instructions to input the first measurement and the at least one first production measurement into a virtual flow meter; and instructions to determine, via the virtual flow meter, a multi-phase flow rate of the fluid based on the first measurement and the at least one first production measurement.

Embodiment #18: The system of Embodiment #17 further comprising: instructions to determine, for the virtual flow meter, a feature set for the well, wherein the feature set includes a production measurement feature and a measurement feature; instructions to configure the virtual flow meter to receive the feature set as input; and instructions to train the virtual flow meter based on training samples, wherein each training sample is associated with the well, wherein each training sample includes a production measurement sample and a measurement sample.

Embodiment #19: The system of Embodiment #18 wherein the feature set further includes a multi-phase flow rate feature, further comprising: instructions to train, during operation, the virtual flow meter based on the multi-phase flow rate, the at least one first production measurement, and the first measurement.

Embodiment #20: The system of Embodiments #18 or #19, wherein determining the multi-phase flow rate includes utilizing the first measurement and the at least one first production measurement in computations that model physical properties of the fluid flowing from the well.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A computer-implemented method for determining flow information of a well producing fluid from a subsurface formation comprising:
    obtaining at least one first production measurement from the well;
    obtaining, with a sensor, a first measurement of an acoustic signal generated by the fluid oscillating in an asymmetric acoustic device, wherein the asymmetric acoustic device is configured to cause the fluid to oscillate as the fluid flows through the asymmetric acoustic device;
    inputting the first measurement and the at least one first production measurement into a virtual flow meter; and
    determining, via the virtual flow meter, a multi-phase flow rate of the fluid based on the first measurement and the at least one first production measurement.

2. The method of claim 1 further comprising:
    determining, for the virtual flow meter, a feature set for the well, wherein the feature set includes a production measurement feature and a measurement feature;
    configuring the virtual flow meter to receive the feature set as input; and
    training the virtual flow meter based on training samples, wherein each training sample includes a production measurement sample and a measurement sample.

3. The method of claim 2 wherein the feature set further includes a multi-phase flow rate feature, further comprising:
training, during operation, the virtual flow meter based on the multi-phase flow rate, the at least one first production measurement, and the first measurement.

4. The method of claim 2, wherein determining the multi-phase flow rate includes utilizing the first measurement and the at least one first production measurement in computations that model physical properties of the fluid flowing from the well.

5. The method of claim 1 further comprising:
performing a wellbore operation based on the multi-phase flow rate.

6. The method of claim 1, wherein the sensor includes a fiber optic cable, a vibration sensing transducer, or a pressure sensing transducer.

7. The method of claim 1 further comprising:
obtaining a fiber optic measurement, wherein determining, via the virtual flow meter, the multi-phase flow rate of the fluid is further based on the fiber optic measurement.

8. The method of claim 1, wherein the at least one first production measurement includes pressure and temperature.

9. A non-transitory computer-readable medium including computer-executable instructions comprising:
instructions to obtain at least one first production measurement from a well producing fluid from a subsurface formation;
instructions to obtain, with a sensor, a first measurement of an acoustic signal generated by the fluid oscillating in an asymmetric acoustic device, wherein the asymmetric acoustic device is configured to cause the fluid to oscillate as the fluid flows through the asymmetric acoustic device;
instructions to input the first measurement and the at least one first production measurement into a virtual flow meter; and
instructions to determine, via the virtual flow meter, a multi-phase flow rate of the fluid based on the first measurement and the at least one first production measurement.

10. The non-transitory computer-readable medium of claim 9 further comprising:
instructions to determine, for the virtual flow meter, a feature set for the well, wherein the feature set includes a production measurement feature and a measurement feature;
instructions to configure the virtual flow meter to receive the feature set as input; and
instructions to train the virtual flow meter based on training samples, wherein each training sample includes a production measurement sample and a measurement sample.

11. The non-transitory computer-readable medium of claim 10 wherein the feature set further includes a multi-phase flow rate feature, further comprising:
instructions to train, during operation, the virtual flow meter based on the multi-phase flow rate, the at least one first production measurement, and the first measurement.

12. The non-transitory computer-readable medium of claim 10, wherein
determining the multi-phase flow rate includes utilizing the first measurement and the at least one first production measurement in computations that model physical properties of the fluid flowing from the well.

13. The non-transitory computer-readable medium of claim 9 further comprising:
instructions to perform a wellbore operation based on the multi-phase flow rate.

14. The non-transitory computer-readable medium of claim 9, wherein the sensor includes a fiber optic cable, a vibration sensing transducer, or a pressure sensing transducer.

15. The non-transitory computer-readable medium of claim 9 further comprising:
instructions to obtain a fiber optic measurement, wherein determining, via the virtual flow meter, the multi-phase flow rate of the fluid is further based on the fiber optic measurement.

16. The non-transitory computer-readable medium of claim 9, wherein the at least one first production measurement includes pressure and temperature.

17. A system comprising:
a sensor;
an asymmetric acoustic device configured to cause a fluid to oscillate as the fluid flows through the asymmetric acoustic device;
a processor, and
a computer-readable medium having instructions stored thereon that are executable by the processor, the instructions including
instructions to obtain at least one first production measurement from a well producing the fluid from a subsurface formation;
instructions to obtain, with the sensor, a first measurement of an acoustic signal generated by the fluid oscillating in the asymmetric acoustic device;
instructions to input the first measurement and the at least one first production measurement into a virtual flow meter; and
instructions to determine, via the virtual flow meter, a multi-phase flow rate of the fluid based on the first measurement and the at least one first production measurement.

18. The system of claim 17 further comprising:
instructions to determine, for the virtual flow meter, a feature set for the well, wherein the feature set includes a production measurement feature and a measurement feature;
instructions to configure the virtual flow meter to receive the feature set as input; and
instructions to train the virtual flow meter based on training samples, wherein each training sample includes a production measurement sample and a measurement sample.

19. The system of claim 18 wherein the feature set further includes a multi-phase flow rate feature, further comprising:
instructions to train, during operation, the virtual flow meter based on the multi-phase flow rate, the at least one first production measurement, and the first measurement.

20. The system of claim 18, wherein determining the multi-phase flow rate includes utilizing the first measurement and the at least one first production measurement in computations that model physical properties of the fluid flowing from the well.

* * * * *